United States Patent

[11] 3,610,664

| [72] | Inventor | Carl Anders Hansson |
| | | Lidkopingsvagen, Johanneshov, Sweden |
| [21] | Appl. No. | 849,647 |
| [22] | Filed | Aug. 13, 1969 |
| [45] | Patented | Oct. 5, 1971 |
| [73] | Assignee | Atlas Copco Aktiebolag |
| | | Nacka, Sweden |
| [32] | Priority | Aug. 30, 1968 |
| [33] | | Sweden |
| [31] | | 11647/68 |

[54] HOSE CONNECTION
3 Claims, 5 Drawing Figs.

[52] U.S. Cl. ............................................. 285/250, 285/39
[51] Int. Cl. ............................................. F16l 33/22
[50] Field of Search ............................................. 285/250, 249, 248, 246, 356, 247, 245, 242

[56] References Cited
UNITED STATES PATENTS

| 3,472,532 | 10/1969 | Leopold et al. | 285/247 X |

FOREIGN PATENTS

| 78,953 | 8/1962 | France | 285/250 |
| 775,706 | 10/1934 | France | 285/250 |
| 356,882 | 9/1931 | Great Britain | 285/247 |
| 510,822 | 6/1955 | Italy | 285/246 |

*Primary Examiner*—Thomas F. Callaghan
*Attorney*—Bauer and Goodman

ABSTRACT: A hose connection for pneumatic tools and other apparatus consists of a recess in the tool or the like having three annular shoulders at the inner ends of two concentric bores of different diameters. A stiffening member with an annular enlargement is fitted in the hose end portion and produces an annular enlargement on the hose. A sleeve fitting the outside of the hose presses the hose and the enlargement thereon against said shoulders.

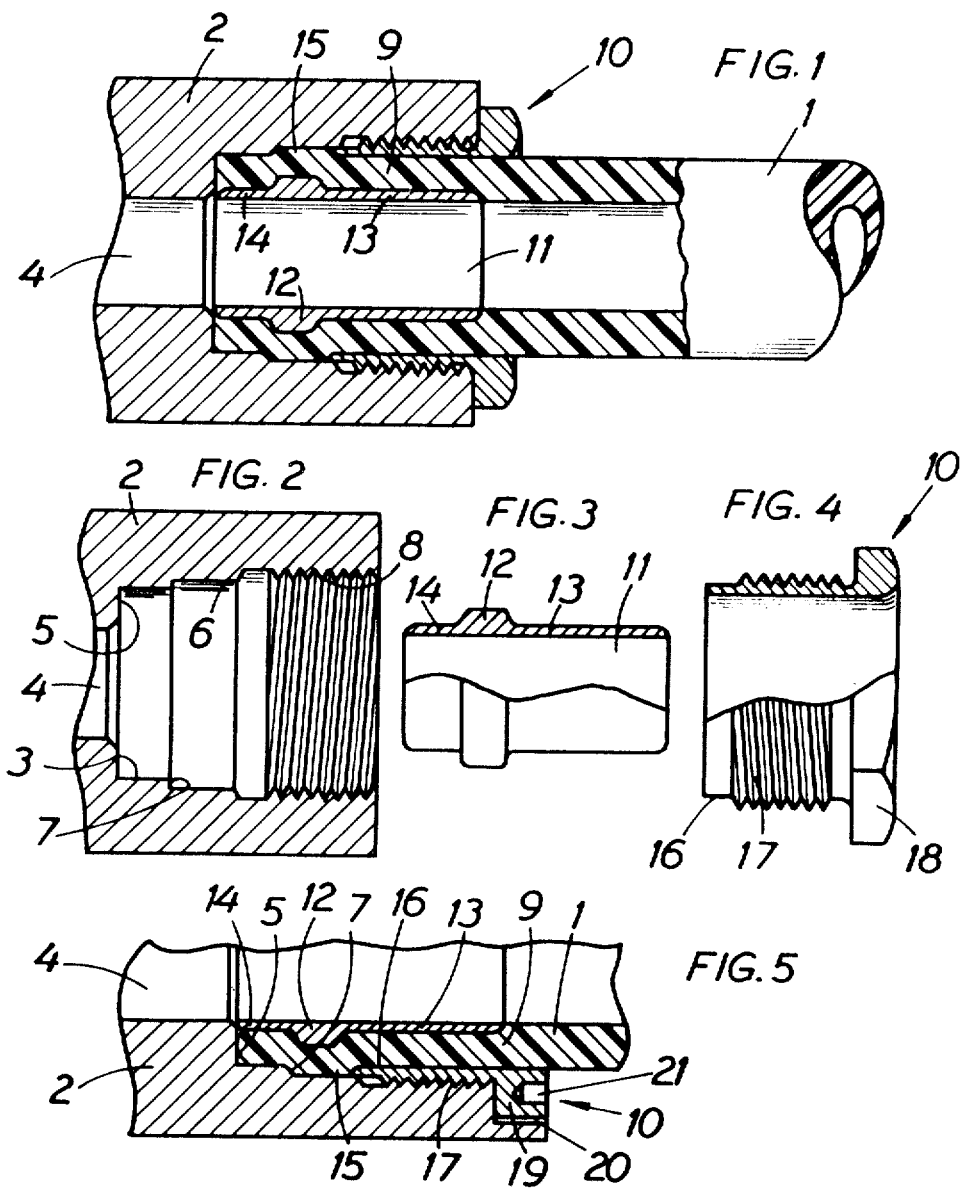

HOSE CONNECTION

This invention relates to a hose connection, particularly for pneumatic tools, comprising an end portion of a hose, a tubular stiffening member having a wall thickness which is small relative to the wall thickness of said hose and an inner diameter substantially equal to the inner diameter of the hose and having an annular external enlargement, which when the stiffening member has been pressed into the hose end portion produces a corresponding annular enlargement at the outside of the hose end portion, a tubular sleeve having an inner diameter substantially equal to the outer diameter of the hose end portion fitted on said hose end portion, and a portion of a pneumatic tool or other apparatus having a passage and a recess communicating therewith and adapted to receive the hose end portion and said tubular sleeve.

Many embodiments of similar hose connections have been constructed which, however, usually are rather complicated and therefore become heavy and lumpy and not fit for connection of a hose to a handle or other part of a compressed air tool or other body or apparatus. Particularly in connection with portable compressed air tools, it is desirable to have access to a hose connection, which does not materially increase the weight of the tool or rather the weight of the tool and the parts of the hose which the worker must hold in his hand. It is furthermore an object of the invention that the hose connection should be smooth and bendable and fit snugly in the tool. A further object of the invention is to provide a hose connection which is very simple to assemble and which consists of details of simple constructional shape.

The invention is principally characterized by a hose connection of the type described hereinabove having shoulders in said recess adapted to form abutments for said hose end portion and said corresponding annular enlargement on the hose end portion, and means for forcing said sleeve against said enlargement on the hose and said hose against said shoulders. Other features of the invention will be disclosed by the following specification and claims.

On the enclosed drawing some embodiments of hose connections according to the invention are illustrated by way of example.

FIG. 1 is a longitudinal section of a hose connection in a pneumatic tool.

FIGS. 2, 3, and 4 illustrate partially in section and side elevation details forming the hose connection according to FIG. 1.

FIG. 5 is a fragmentary longitudinal section similar to FIG. 1 and illustrates a second embodiment of the invention.

The hose connection illustrated in FIGS. 1–4 is particularly intended for pneumatic tools or other pneumatic apparatus in which it is desirable to connect a hose 1 to a body 2 which may consist of a portion of a handle of pneumatic tool, a coupling board for pneumatic tools or apparatus, a pneumatically operated spray gun, a pipe-fitting for a compressed air network, or the like. The hose connection may naturally also be used for connecting pressure water hoses or pressure oil hoses to apparatuses to which such fluids are to be supplied or for other purposes. A very commonly used hose connection consists of a stiffening sleeve which is pressed into a hose end portion, a sleeve which encloses said end portion a double conical sealing ring which is fitted on the hose end portion and which by the pressure of the sleeve upon screwing of the sleeve into the recess is pressed against the walls of the recess and against the walls of the hose end portion and thereby produces a sealing effect. Such hose connections are complicated and lumpy and the invention involves a considerable simplification of hose connections of the type just described. In the hose connection according to the invention, the recess provided in the body 2 according to FIGS. 1 and 2 consists of a bore 3 with small diameter which communicates directly with a passage 4 in the body 2 and ends in a shoulder 5, preferably formed as an annular shoulder in a plane perpendicular to the longitudinal direction of the bore. A second bore 6 in the body 2 forms an intermediate portion of the recess and ends at a shoulder 7, preferably an annular shoulder in a plane perpendicular to the longitudinal direction of the second bore. A third bore 8 in the outer portion of the recess has a threaded portion the inner diameter of which is substantially the same as the diameter of the bore 6. The bores 3, 6, and 8 form together the recess in which the hose end portion 9 of the hose 1 is inserted and secured.

Before inserting the hose end portion in the recess 3, 6, 8 a sleeve 10 is press fitted on the hose end portion and thereafter a stiffening sleeve 11 is pressed into the hose end portion 9. The stiffening sleeve 11 consists of a tubular body, which in the illustrated embodiment has an external annular enlargement 12 which is situated between two cylindrical tubular portions 13, 14 of the stiffening sleeve 11, the portion 13 being substantially longer than the portion 14 and intended to be pressed into the hose end portion remote form its end, as illustrated in FIG. 1. The stiffening sleeve 11 may preferably comprise a metallic sleeve, or a hard plastic sleeve, and the length thereof may preferably be the same as the total length of the recess 3, 6, 8. Upon forcing of the stiffening sleeve 11 into the hose end portion 9, an external annular enlargement 15 is formed on the hose end portion substantially corresponding to the annular enlargement on the stiffening sleeve. The sleeve 10 has an internal diameter which substantially corresponds to the outer diameter of the hose, and the sleeve 10 is furthermore provided with an inner cylindrical tubular end portion 16 which fits into the bore 6 and which merges in a threaded portion 17 which fits into and may be screwed into the threaded portion 8 of the recess. The projecting end of the sleeve 10 is provided with a hexagonal flange 18 which forms a grip portion for a tool by means of which the sleeve may be screwed into the threaded portion 8 in the recess in the body 2. The hose end portion 9 which should preferably be cut perpendicular to its longitudinal axis is during the assembly at first pushed into the bores 3 and 6 whereupon the sleeve 10 is screwed into the threaded portion 8 so that the tubular portion 16 of the sleeve presses the annular enlargement 15 and the hose in the direction towards the shoulders 7 and 5 so that a good sealing fit is obtained.

FIG. 5 illustrates a fragmentary longitudinal section of a modification of the hose connection according to FIGS. 1–4. Equivalent details have in FIG. 5 been indicated with the same reference numerals and are not described again. Instead of the grip portion 18, the sleeve 10 in FIG. 5 is provided with an annular flange 19 which upon assembly enters a corresponding annular counterbore 20 in the body 2. The sleeve 10 may be screwed into the recess in the body 2 by means of a suitable tool which may engage a number of holes 21 in the flange 19.

The hose connection according to the above described embodiments of the invention should only be considered as examples, and the details of the invention may be modified in different ways within the scope of the following claims.

I claim:

1. A hose connection, particularly for pneumatic tools, comprising an end portion of a hose, a tubular stiffening member having a wall thickness which is small relative to the wall thickness of said hose and an inner diameter of the hose positioned in a press-fit in the said end portion of said hose, said stiffening member having an annular external enlargement, which when the stiffening member has been pressed into the hose end portion produces a corresponding annular enlargement at the outside of the hose end portion, a tubular sleeve having an inner diameter substantially equal to the outer diameter of the hose end portion fitted on said hose end portion, and a portion of a pneumatic tool or other apparatus having a passage and a recess communicating therewith and adapted to receive the hose end portion and said tubular sleeve, said recess having first, second and third bore portions forming said recess and having stepwise increasing diameters starting from a first shoulder at the inner end of the recess forming an abutment for said hose end portion and the tubular end of said stiffening member, a second shoulder at the inner end of said second bore portion forming an abutment for said annular enlargement on the hose end portion, and means for forcing said tubular sleeve against said annular enlargement on said hose and said stiffening member against said shoulders, said tubular sleeve and said means completely filling the space in said recess around said hose end portion so that the material comprising said hose end portion is completely enclosed under compression.

2. A hose connection according to claim 1, in which the means for forcing the sleeve against the enlargement on the hose consists of cooperating screw threads on the sleeve and in the recess and a grip portion on the sleeve accessible at the mouth of the recess for screwing the sleeve into the recess to force the hose towards the shoulders.

3. A hose connection according to claim 1, in which the abutments are formed a first one at the inner end of the recess and a second one at a distance from said inner end corresponding to the distance between the hose end and the enlargement on the hose, and that a cylindrical end portion is provided on the sleeve which fits the recess outside said second abutment.